(12) United States Patent  
Milligan et al.

(10) Patent No.: US 9,360,040 B2  
(45) Date of Patent: Jun. 7, 2016

(54) POLYMER FILLED CAPPED NUT

(71) Applicants: Sean K. Milligan, Royal Oak, MI (US); Gregory A. Dean, Rochester, MI (US)

(72) Inventors: Sean K. Milligan, Royal Oak, MI (US); Gregory A. Dean, Rochester, MI (US)

(73) Assignee: MACLEAN-FOGG COMPANY, Mundelein, IL (US)

( * ) Notice: Subject to any disclaimer, the term of this patent is extended or adjusted under 35 U.S.C. 154(b) by 194 days.

(21) Appl. No.: 13/766,119

(22) Filed: Feb. 13, 2013

(65) Prior Publication Data  
US 2013/0216330 A1 Aug. 22, 2013

Related U.S. Application Data

(60) Provisional application No. 61/599,697, filed on Feb. 16, 2012.

(51) Int. Cl.  
F16B 37/14 (2006.01)

(52) U.S. Cl.  
CPC ................... F16B 37/14 (2013.01)

(58) Field of Classification Search  
CPC ..................................... F16B 37/14  
USPC ................... 411/429–431; 470/24  
See application file for complete search history.

(56) References Cited

U.S. PATENT DOCUMENTS

| 972,140 | A | * | 10/1910 | Adam | 411/429 |
| 1,941,175 | A | * | 12/1933 | Johnson | 411/429 |
| 3,470,787 | A | * | 10/1969 | Mackie | 411/377 |
| 3,585,900 | A | * | 6/1971 | Chaivre | 411/430 |
| 4,322,195 | A | * | 3/1982 | Rebish et al. | 411/431 |
| 4,519,974 | A | * | 5/1985 | Bravenec et al. | 264/279 |
| 4,764,070 | A | * | 8/1988 | Baltzell et al. | 411/430 |
| 4,826,380 | A | * | 5/1989 | Henry | 411/377 |
| 4,887,950 | A | * | 12/1989 | Sakayori et al. | 411/302 |
| 4,923,348 | A | * | 5/1990 | Carlozzo et al. | 411/377 |
| 4,968,202 | A | * | 11/1990 | Lanham | 411/431 |
| 4,993,902 | A | * | 2/1991 | Hellon | 411/430 |
| 5,277,530 | A | * | 1/1994 | Sweeney et al. | 411/258 |
| 5,324,149 | A | * | 6/1994 | Bainbridge et al. | 411/431 |
| 5,697,745 | A | * | 12/1997 | Shaw | 411/258 |
| 5,772,377 | A | * | 6/1998 | Bydalek | 411/429 |
| 6,318,942 | B1 | * | 11/2001 | Wieczorek | 411/431 |
| 6,866,457 | B2 | * | 3/2005 | Wilson | 411/431 |
| 2003/0035701 | A1 | * | 2/2003 | Hui | 411/372.5 |
| 2011/0116892 | A1 | * | 5/2011 | Wilson | 411/372.5 |
| 2012/0219380 | A1 | * | 8/2012 | Hutter, III | 411/377 |
| 2013/0149071 | A1 | * | 6/2013 | Davis et al. | 411/402 |

* cited by examiner

Primary Examiner — Gary Estremsky  
(74) Attorney, Agent, or Firm — Brinks Gilson & Lione

(57) ABSTRACT

Capped nuts are provided with an polymer in the top portion of the capped nut. The polymer may be disposed between the inner surface of the cap and a nut body. The polymer may extend into a top opening in the nut body and contact an inner wall of the opening in the nut body.

14 Claims, 4 Drawing Sheets

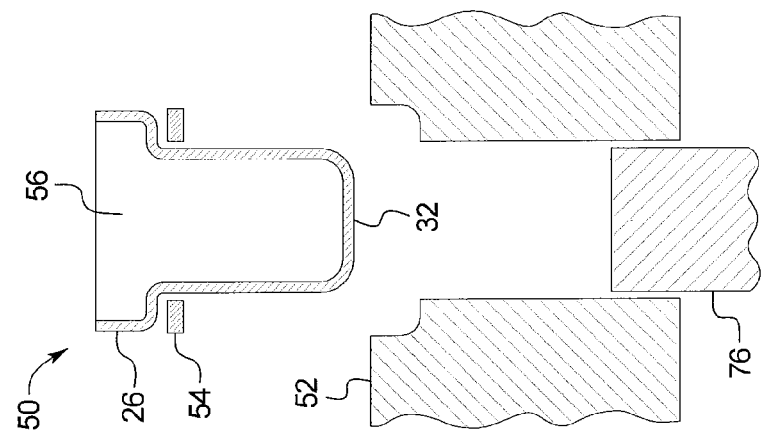
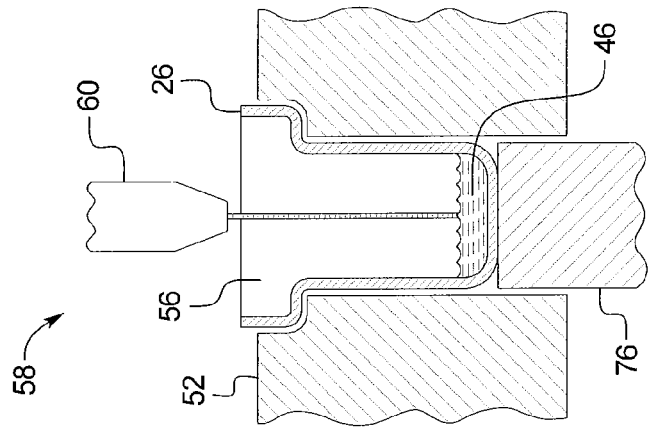
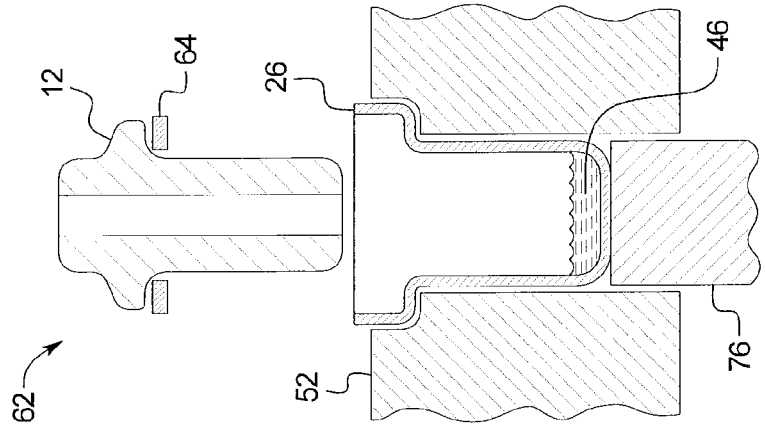

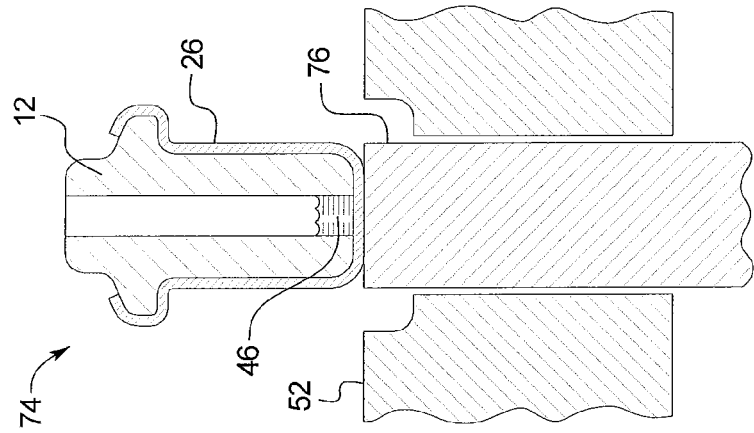
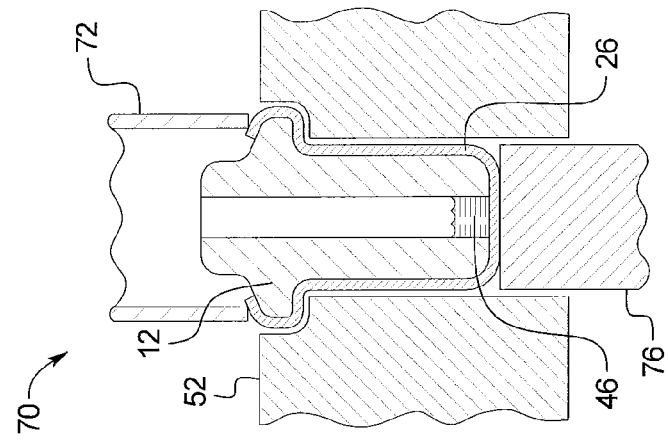
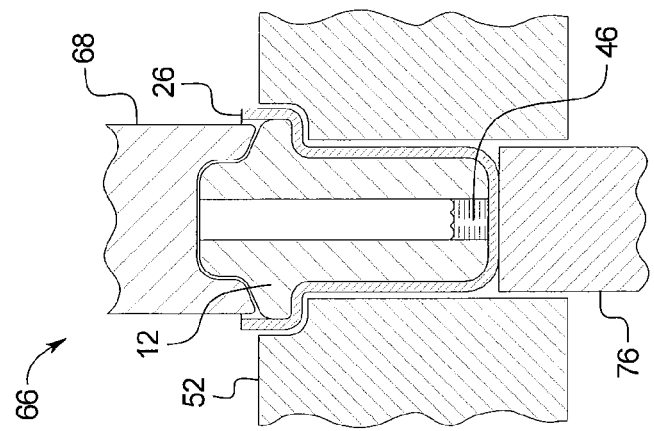

POLYMER FILLED CAPPED NUT

This application claims priority to U.S. Provisional Application No. 61/599,697, filed Feb. 16, 2012, which is hereby incorporated by reference herein.

BACKGROUND

The present invention relates generally to fasteners and more particularly to a nut with a cap secured to a nut body.

A nut is one type of fastener that is commonly used to attach various components together. Typically, a nut has at least an internal threaded portion and one or more external bearing surfaces attached thereto. The bearing surfaces are designed to receive torque from a tool, such as a socket or other wrench, which is used to tighten or loosen the nut. For example, in a conventional nut, the nut may have six bearing surfaces oriented in a hexagonal shape around the internal threads. However, it is possible for nuts to have a different number of bearing surfaces as desired.

Aesthetics is one concern for certain nuts, such as automobile wheel nuts. In particular, many automotive consumers are drawn to the aesthetics of an automobile's wheels, since this is often a distinctive part of an automobile. As a result, wheel nuts have become an integral component of the aesthetics of automotive wheels, and automobiles more generally, because wheel nuts form a highly visible pattern around the center of a wheel.

One approach that has been highly successful in addressing wheel nut aesthetics is stainless steel capped wheel nuts. In this solution, a nut insert is capped with a stainless steel covering. Since stainless steel is resistant to corrosion, durable and visually attractive, stainless steel capped wheel nuts have been capable of addressing a large portion of the demand for aesthetically pleasing wheel nuts. Another advantage of stainless steel capped wheel nuts is that the color of stainless steel, a shiny silverish color, generally matches the color used for most automobile wheels. One disadvantage, however, of stainless steel capped wheel nuts is the cost of manufacturing such wheel nuts.

One problem with conventional capped nuts is that the cap can be damaged by rough handling. Such damage may make a capped wheel nut less aesthetically appealing, and thus, may be rejected by a manufacturer or a consumer. Handling damage usually occurs when capped nuts are shipped in bulk containers with hundreds or thousands of capped nuts mixed together in a container. Because the capped nuts are typically in contact with each other during shipping, rough handling of the shipping container can cause the capped nuts to beat against each other and damage each other.

Accordingly, the inventor believes it would be desirable to provide an improved capped nut that is more resistant to damage.

SUMMARY

A capped nut is described with an polymer inside the cap between the cap and the nut body. The polymer contacts the inner surface of the top of the cap and the inner wall of an opening extending through the nut. One advantage of the polymer is that it increases the damage resistance of the top of the cap. A method for manufacturing the capped nut is also described. The inventions herein may also include any other aspect described below in the written description or in the attached drawings and any combinations thereof.

BRIEF DESCRIPTION OF SEVERAL VIEWS OF THE DRAWINGS

The invention may be more fully understood by reading the following description in conjunction with the drawings, in which:

FIG. 4A is a schematic view of first step in manufacturing a nut;

FIG. 4B is a schematic view of second step in manufacturing a nut;

FIG. 4C is a schematic view of third step in manufacturing a nut;

FIG. 4D is a schematic view of fourth step in manufacturing a nut;

FIG. 4E is a schematic view of fifth step in manufacturing a nut; and

FIG. 4F is a schematic view of sixth step in manufacturing a nut.

DETAILED DESCRIPTION

Figure 1:
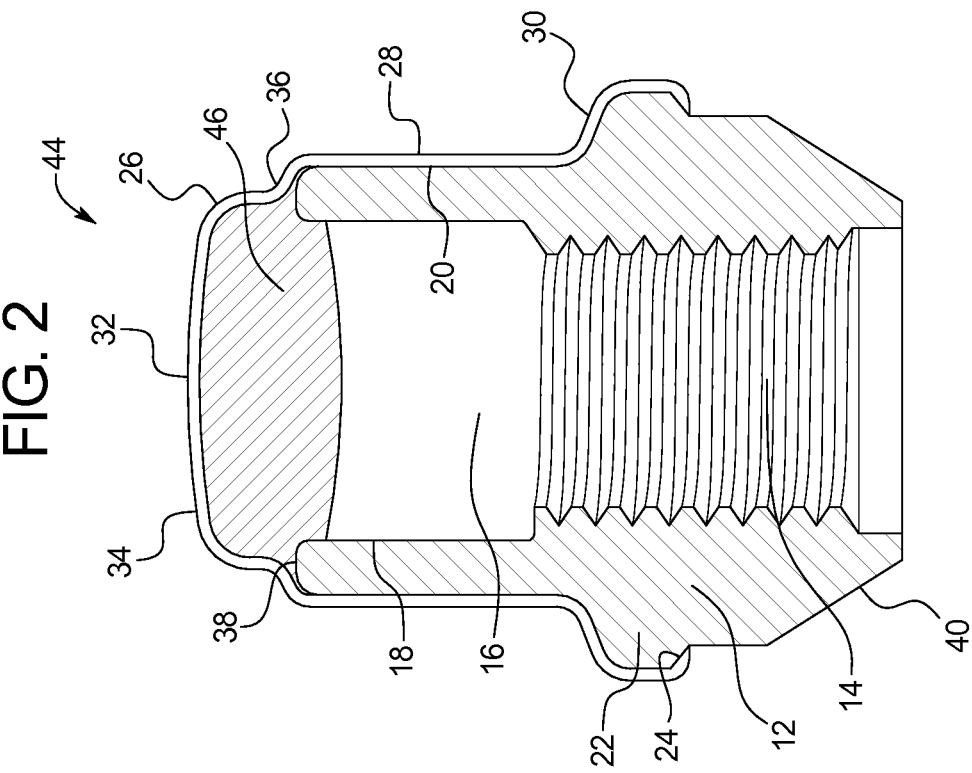
FIG. 1 is a cross-sectional view of a nut.

Referring now to the figures, and particularly to FIG. 1, a conventional automotive capped wheel nut 10 is shown. The nut 10 includes a metallic nut body 12 with internal threads 14 that are threadable onto the external threads of a mating fastener. Preferably, an axial opening 16 extends through the entire length of the nut body 12, although the top portion 18 of the opening 16 may be unthreaded 18. The nut body 12 also includes wrenching surfaces 20 that receive wrenching forces during tightening and loosening of the nut 10 and transfers the torque to the threaded portion 14. The nut body 12 may have six wrenching surfaces 20 arranged in a conventional hexagonal shape around the axial opening 16 and the internal threads 14. Preferably, the nut body 12 has a flange 22 below the wrenching surfaces 20 that extends outward from the wrenching surfaces 20 and has an inward extending step 24 below the flange 22.

The nut body 12 is inserted into it a cap 26 that may be made from a metal, such as stainless steel, by stamping. The cap 26 has corresponding wrenching surfaces 28 that wrap around the wrenching surfaces 20 of the nut body 12. The lower portion of the cap 26 preferably forms a skirt 30 that covers the flange 22 of the nut body 12. The cap 26 may be secured to the nut body 12 by welding or other suitable means, but in the preferred embodiment the skirt 30 wraps around the flange 22 of the nut body 12 and engages the step 24 below the flange 22. The top 32 of the cap 26 covers the top of the opening 16 in the nut body 12. Thus, the majority of the nut body 12, including the top opening 16, is not visible to a consumer when the nut 10 is threaded onto a mating fastener, such as an automotive wheel stud.

In the embodiment shown FIG. 1, the cap 26 has a raised dome 34 along the top 32. Typically, raised domes 34 are provided for aesthetic reasons, since it is believed by some that a raised dome 34 is more attractive than a generally flat or undomed top. Thus, the height of the dome 34 is usually dictated by aesthetic concerns. In the dome design, a ring portion 36 of the cap 26 wraps over the top surface 38 of the nut body 12 and is located relatively close to the top surface 38 of the nut body 12. Thus, the dome 34 forms a circular center portion 34 that is raised up from the ring portion 36.

One particular area of capped nuts 10 that is more sensitive to rough handling is the top 32 of the cap 26. This is an area of concern for several reasons. The top 32 of the cap 26 is less supported than the rest of the cap 26 because the top 32 of the cap 26 covers the opening 16 through the nut body 12. In addition, the top 32 of the cap 26 is the most visible portion of the nut 10 to consumers in certain applications, such as automotive wheel nuts 10.

One test that has been developed to test the durability of the top portion 32 of capped wheel nuts 10 is a drop test. In the drop test, the capped nut 10 being tested is placed on a support surface with the top 32 of the cap 26 facing upward. Another nut is then raised above the test nut 10 at a set height and at an angle with one side of the nose 40 of the nut pointing downwards towards the top 32 of the test nut 10. The raised nut is then dropped so that the angled nose 40 of the raised nut hits the top 32 of the cap 26 of the test nut 10. This test is intended to simulate rough handling of capped nuts 10 when they are packaged in bulk containers with many capped nuts 10 mixed together in a container. It has been found that capped wheel nuts 10 in bulk containers typically do not become damaged during normal bouncing that occurs from roadway motion or moving containers from place to place in a staging area. Instead, more significant damage occurs in instances like international ocean shipping when heavy loads are placed on top of a container of capped nuts 10 and the heavy load crushes the capped nut 10 container. Thus, damage typically does not occur from capped nuts 10 jostling against each other during travel motion, but instead, occurs when the capped nuts 10 are squeezed together by an event that also damages the shipping container.

Figure 3A:
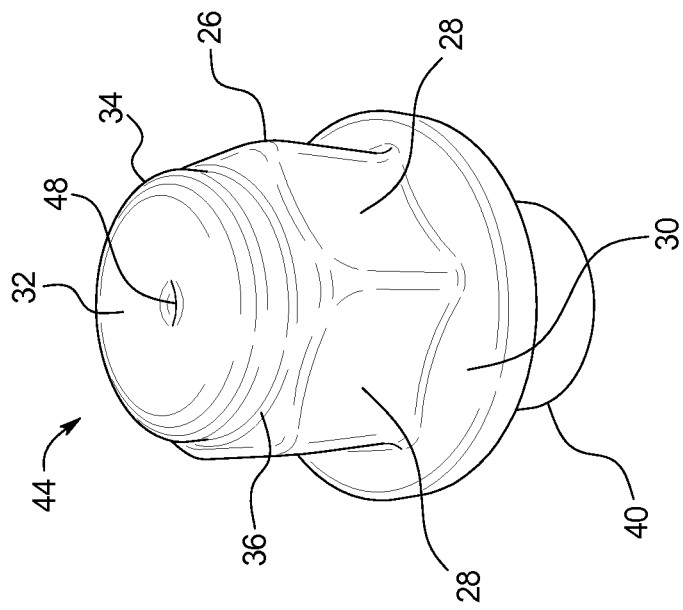
FIG. 3A is a top perspective view of the nut of FIG. 1, showing damage to the top of the nut.

An example of a damaged capped nut 10 is shown FIG. 3A. As shown, the conventional capped nut 10 has a significant dent 42 along the top 32 of the dome 34. This is the type of damage that would result in the automobile manufacturer rejecting the capped nut 10. Because this type of damage is usually caused by an isolated event that affects an entire shipping container as noted above, a large number of capped nuts 10 in an affected container can be damaged like this. As a result, automobile manufacturers sometimes reject an entire shipping container of capped nuts 10 instead of trying to sort undamaged nuts 10 from damaged nuts 10. Unfortunately, it is not economical to repair capped nuts 10 that are damaged like FIG. 3A, and thus, damaged capped nuts 10 must be scrapped.

Figure 2:
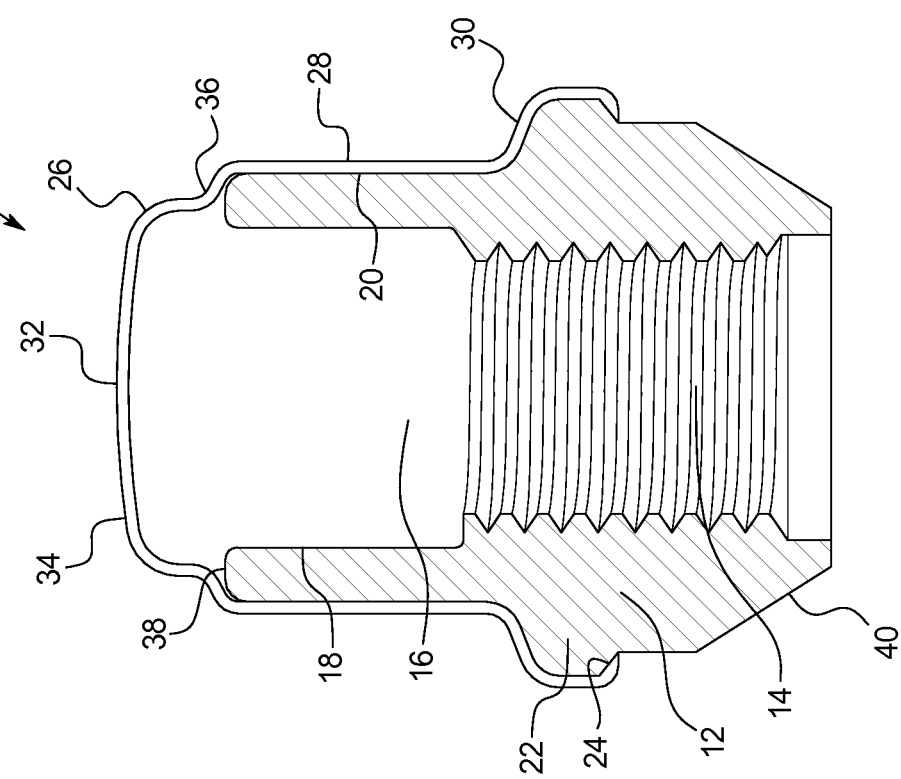
FIG. 2 is a cross-sectional view of another nut.

Turning to FIG. 2, an improved capped nut 44 is shown. A polymer 46 may be disposed within the opening 16 and along the inner surface of the top 32 of the cap 26. The polymer 46 referred to herein has a fluid state and a hardened state. As described further below, the polymer 46 may be injected into the cap 26 in the fluid state and thereafter hardens along an inner surface of the cap 26. Preferably, the polymer is an epoxy or other adhesive, but may also be other hardenable polymers, such as thermoplastic, thermoset or UV curable polymers. Preferably, the polymer 46 extends partially into the opening 16, and is disposed between the top surface 38 of the nut body 12 and the inner surface of the ring portion 36 of the cap 26. Thus, the polymer 46 fully fills the top area of the inner region of the nut 44. While the top portion of the opening 16 may be threaded, in the embodiment of FIG. 2 the polymer 46 contacts an unthreaded top portion 18 of the opening 16. The polymer 46 preferably has a Shore D durometer of 80 or higher. For example, ITW Devcon 1 Minute Epoxy or Resinlab EP1026 may be used.

Figure 3B:
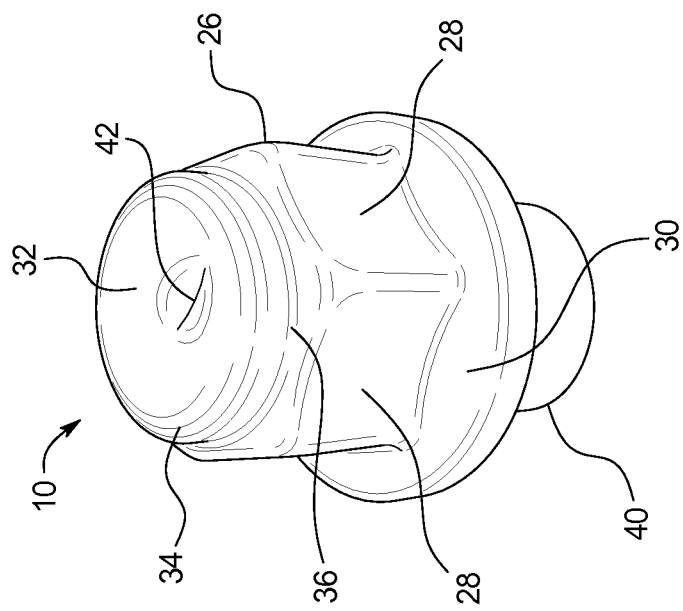
FIG. 3B is a top perspective view of the nut of FIG. 2, showing damage to the top of the nut.

As shown in FIG. 3B, the polymer 46 fill provides greater support to the top 32 of the cap 26 and increases the resistance of the cap 26 to damage. Thus, when the same drop test is performed on the improved capped wheel nut 46 as described above, only a small scratch 48 or crease 48 occurs instead of a large dent 42 as with the conventional nut 10 shown in FIG. 3A. As a result, the damage resistance of the nut 44 is greatly improved. Because of the increase in damage resistance, it is also possible that the thickness of the cap 26 may be reduced to decrease the manufacturing costs of capped nuts 44. For example, stainless steel caps 26 for capped wheel nuts 10 commonly have a thickness of about 0.018". However, capped wheel nuts 10 with larger domes 34 sometimes require cap thicknesses of 0.020" or 0.023". The increased cap thickness for nuts 10 with larger domes 34 is primarily due to the need to strengthen the unsupported top 32 of the cap 26. However, it is possible that with the use of the described polymer 46, the cap thickness may be about 0.015" to about 0.018" for nuts 44 with the inner surface of the cap 26 disposed at least 0.180" above the top surface 38 of the nut body 12. In addition, even for capped nuts 44 without larger domes 34, the cap thickness may be reduced compared to conventional capped nuts 10. For example, the cap thickness may be about 0.012" to about 0.015" compared to about 0.018" for conventional stainless steel capped wheel nuts 10. Preferably, the cap thickness is within the range of about 0.012" to about 0.018".

Turning to FIGS. 4A-4F, the polymer 46 may be injected into the capped nut 44 during the manufacturing of the capped nut 44. The capped nut 44 may be manufactured in a multistation automated assembly machine as schematically depicted in FIGS. 4A-4F. However, the manufacturing method is not limited to a single machine or to a limited number of stations. For example, there may be additional stations between the depicted stations for inspection steps or other purposes and there may be other non-operational stations in the machine.

As shown in FIG. 4A, in the first station 50 the cap 26 is placed in a fixture 52 with fingers 54 so that the cap 26 is oriented upside down in the fixture 52. In other words, the bottom opening 56 of the cap 26 faces upward and the closed top 32 faces downward.

In the second station 58, as shown in FIG. 4B, the polymer 46 is injected in a fluid state from a nozzle 60 through the bottom opening 56 of the cap 26 onto the inner surface of the closed top 32. As a result, a pool of polymer 46 forms on the inner surface of the top 32 of the cap 26.

In the third station 62, as shown in FIG. 4C, the nut body 12 is inserted into the cap 26 through the bottom opening 56 of the cap 26 with fingers 64.

In the fourth station 66, as shown in FIG. 4D, the nut body 12 is pressed into the cap 26 with a ram 68. Although the polymer 46 may come into contact with the nut body 12 in the third station 62, the pressing in the fourth station 66 squeezes the polymer 46 between the inner surface of the top 32 of the cap 26 and the top surface 38 of the nut body 12. Excess polymer 46 flows upward through the opening 16 in the nut body 12 and contacts the inner wall of the top portion 18 of the opening 16.

In the fifth station 70, as shown in FIG. 4E, the skirt 30 of the cap 26 is crimped around the flange 22 of the nut body 12 with a die 72.

In the sixth station 74, as shown in FIG. 4F, the assembled nut 44 is unloaded from the fixture 52 with a pin 76 and is subsequently transferred to a bulk container with other assembled nuts 44.

As described above, one advantage of the improved nut 44 is increased damage resistance along the top 32 of the nut 44. Another advantage is that the polymer 46 injection can be incorporated into existing manufacturing methods for capped nuts 10, 44. In particular, by injecting the polymer 46 into the cap 26 before inserting the nut body 12, the polymer 46 does not come into contact with the threads 14 of the nut body 12 along the bottom portion of the nut body 12. The sequence of the method also avoids introducing air pockets into the polymer. In this regard, it is preferable for the polymer 46 to harden before the nut 44 is unfixtured and turned upright so that the polymer 46 remains in the top of the nut 44 and does not flow into the bottom threads 14. Since capped nut 44 assembly typically involves high volume production, it is preferable for the polymer 46 to harden within 20 seconds or less. However, it is not necessary for the polymer 46 to fully harden before the nut 44 is unfixtured and transferred to a bulk container. The reason for this is that the manufacturing facility is usually a controlled environment and there is little risk of damage to the caps 26 even in bulk storage in the manufacturing facility. However, it is preferable for the polymer 46 to fully harden before the capped nuts 44 leave the manufacturing facility. Thus, it is preferable for the polymer 46 to fully harden within 24 hours or less, which is a typical time period that assembled capped nuts 44 remain in the manufacturing facility before shipping.

While preferred embodiments of the invention have been described, it should be understood that the invention is not so limited, and modifications may be made without departing from the invention. The scope of the invention is defined by the appended claims, and all devices that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment of the invention.

I claim:

1. A nut comprising:
   a nut body comprising an opening and a plurality of wrenching surfaces, said opening extending longitudinally through said nut body and comprising an internal thread along at least a bottom portion of said opening, said wrenching surfaces being disposed around an exterior of said nut body;
   a cap disposed around a portion of said nut body and secured thereto, said cap covering a top of said opening; and
   a hardenable support material disposed within said opening and contacting substantially all of an inner surface of said cap disposed above said top of said opening and contacting an inner wall of a top portion of said opening;
   wherein said hardenable support material is injected into said cap in a fluid state, said hardenable support material pooling and hardening along said inner surface of said cap, hardenable support material has a Shore D durometer of 80 or higher, said hardenable support material thereby supporting said cap to increase damage resistance of said cap.

2. The nut according to claim 1, wherein said hardenable support material is a polymer.

3. The nut according to claim 2, wherein said polymer is further disposed between a top surface of said nut body and said cap.

4. The nut according to claim 2, wherein said top portion of said opening contacting said polymer is unthreaded.

5. The nut according to claim 2, wherein said polymer is an epoxy.

6. The nut according to claim 2, wherein said nut is an automotive wheel nut, said nut body is metallic and said cap is metallic, said polymer is further disposed between a top surface of said nut body and said cap, and a thickness of said cap is about 0.012" to about 0.18".

7. The nut according to claim 6, wherein said top portion of said opening contacting said polymer is unthreaded, said cap is secured to said nut body with a skirt of said cap wrapped around a flange of said nut body, and said polymer is an epoxy.

8. The nut according to claim 2, wherein said nut is an automotive wheel nut, said polymer is an epoxy, said polymer is further disposed between a top surface of said nut body and said cap, said top portion of said opening contacting said polymer is unthreaded, and said cap is secured to said nut body with a skirt of said cap wrapped around a flange of said nut body.

9. The nut according to claim 1, wherein said cap is secured to said nut body with a skirt of said cap wrapped around a flange of said nut body.

10. The nut according to claim 1, wherein said cap forms a dome covering said top of said opening, said inner surface of said cap disposed at least 0.180" above a top surface of said nut body.

11. The nut according to claim 10, wherein said cap is metallic and a thickness of said cap is about 0.015" to about 0.18".

12. The nut according to claim 1, wherein said cap is metallic and a thickness of said cap is about 0.012" to about 0.015".

13. The nut according to claim 1, wherein said nut body is metallic and said cap is metallic.

14. The nut according to claim 1, wherein said nut is an automotive wheel nut.

* * * * *